(12) United States Patent
Onishi et al.

(10) Patent No.: US 9,057,390 B2
(45) Date of Patent: Jun. 16, 2015

(54) ELECTRO HYDROSTATIC ACTUATOR

(75) Inventors: Takaaki Onishi, Hyogo (JP); Taku Kondo, Hyogo (JP); Yasuto Onomichi, Hyogo (JP); Shogo Hagihara, Hyogo (JP); Ryo Takaki, Hyogo (JP)

(73) Assignee: Sumitomo Precision Products Co., Ltd., Amagasaki-shi (JP)

( * ) Notice: Subject to any disclaimer, the term of this patent is extended or adjusted under 35 U.S.C. 154(b) by 470 days.

(21) Appl. No.: 13/617,444

(22) Filed: Sep. 14, 2012

(65) Prior Publication Data

US 2013/0067898 A1   Mar. 21, 2013

(30) Foreign Application Priority Data

Sep. 15, 2011   (JP) .................................. 2011-201743

(51) Int. Cl.
*F15B 15/18* (2006.01)
*B64C 13/50* (2006.01)

(52) U.S. Cl.
CPC ........... *F15B 15/18* (2013.01); *B64C 2013/506* (2013.01)

(58) Field of Classification Search
CPC ...... F15B 1/265; F15B 7/006; F15B 13/0444; F15B 15/1423; F15B 15/18; F15B 2211/20515
USPC .................... 60/473, 475, 476, 478
See application file for complete search history.

(56) References Cited

U.S. PATENT DOCUMENTS

| 2,918,795 | A | 12/1959 | Marien |
| 7,538,458 | B2 * | 5/2009 | Soitu ............................. 310/58 |
| 2003/0077183 | A1 * | 4/2003 | Franchet et al. .............. 417/269 |
| 2007/0209357 | A1 | 9/2007 | Sato et al. |

FOREIGN PATENT DOCUMENTS

| DE | 1088684 B | | 9/1960 | |
| DE | 1258692 B | * | 1/1968 | ............ F15B 15/18 |
| EP | 1306560 A1 | | 5/2003 | |
| JP | 2007-239974 A | | 9/2007 | |

OTHER PUBLICATIONS

European Patent Office, Extended European Search Report for Application No. 12184283.5, Feb. 2, 2015, 7 pages, Germany.

* cited by examiner

*Primary Examiner* — Dwayne J White
*Assistant Examiner* — Matthew Wiblin
(74) *Attorney, Agent, or Firm* — Alston & Bird LLP

(57) ABSTRACT

An electro hydrostatic actuator includes an actuator body, a hydraulic pump driven to supply operation oil to the actuator body, and an electric motor configured to drive the hydraulic pump. Each of the hydraulic pump and the electric motor is placed so as to surround the outer periphery of the actuator body, and the hydraulic pump and the electric motor are arranged in a direction along a center axis.

2 Claims, 3 Drawing Sheets

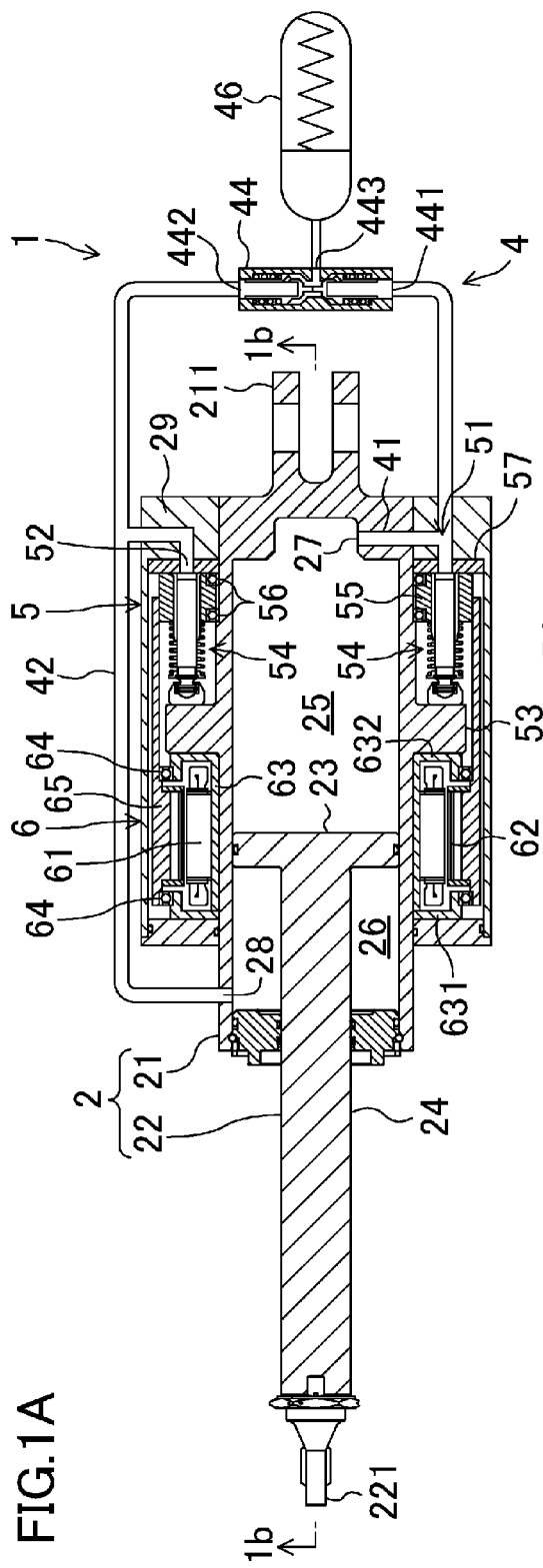
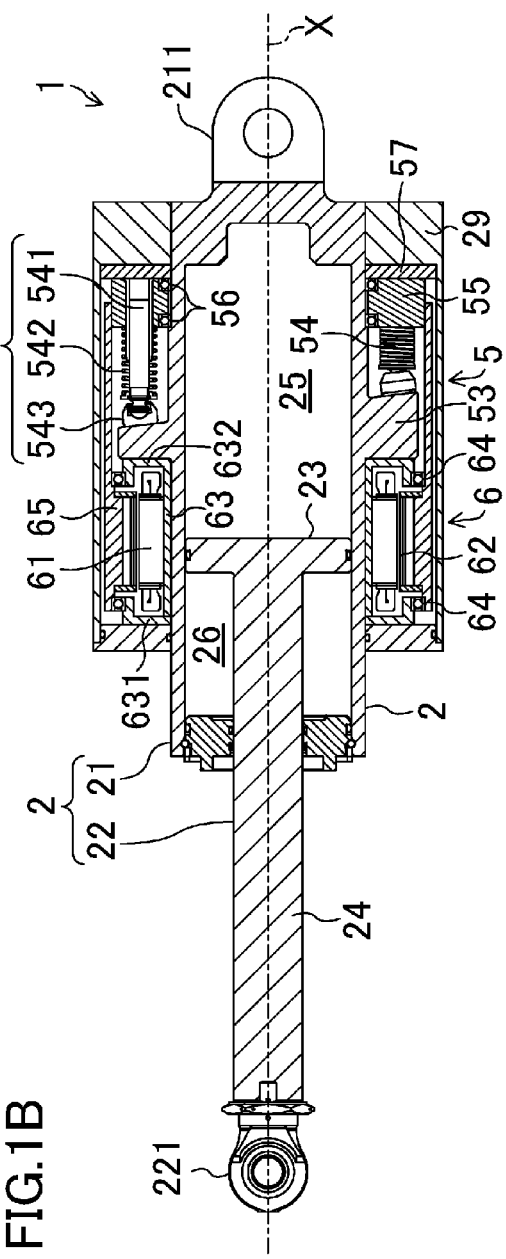
FIG.1A
FIG.1B

ELECTRO HYDROSTATIC ACTUATOR

CROSS-REFERENCE TO RELATED APPLICATION

This application claims priority to Japanese Patent Application No. 2011-201743 filed on Sep. 15, 2011, the disclosure of which including the specification, the drawings, and the claims is hereby incorporated by reference in its entirety.

BACKGROUND

A technique disclosed herein relates to an electro hydrostatic actuator (EHA) system which is applicable as various actuators for, e.g., an aircraft.

In recent years, from the point of improvement of fuel consumption of an aircraft and reduction of maintenance tasks of an aircraft, it has been proposed that an EHA is installed as an actuator for, e.g., a landing gear retraction/extension operation, a steering operation, a braking operation, and a fluid control operation, instead of a conventional hydraulic actuator system installed in an existing conventional aircraft (see, e.g., Japanese Patent Publication No. 2007-239974). An EHA system includes an extendable hydraulic linear actuator having a cylinder and a piston, a hydraulic pump, and an electric motor. The hydraulic pump is driven by the electric motor, thereby operating the extendable hydraulic linear actuator without a supply of oil pressure from an outside hydraulic source.

SUMMARY

In the EHA system described in the foregoing patent document, the hydraulic pump and the electric motor are placed at the side of the extendable hydraulic linear actuator. A specific configuration diagram is not provided in the foregoing patent document. However, the hydraulic pump and the electric motor are placed at the side of the extendable hydraulic linear actuator, e.g., an attachment flange is provided on an outer surface of the cylinder of the extendable hydraulic linear actuator, and the hydraulic pump and the electric motor are fixed to the extendable hydraulic linear actuator through the attachment flange.

However, in the EHA in which the hydraulic pump and the electric motor are placed at the side of the extendable hydraulic linear actuator in parallel and fixed through the attachment flange, the hydraulic pump and the electric motor are displaced from a center axis of the extendable hydraulic linear actuator. Thus, the position of the center of gravity of the EHA is greatly displaced from the center axis thereof.

In the EHA, a movable end of a piston rod and a fixed end of the cylinder, which are placed on the center axis of the hydraulic actuator, are each attached and fixed to aircraft equipment. The EHA in which the position of the center of gravity is greatly displaced from the center axis is extremely disadvantageous to satisfaction of vibration requirements derived from the aircraft. In order to satisfy the vibration requirements, it is necessary to increase the strength at the attachment portion of each of the hydraulic pump, the electric motor, and the extendable hydraulic linear actuator by increasing the size or thickness of the attachment flange. However, this results in an increase in weight of the EHA system.

The technique disclosed herein has been made in view of the foregoing, and it is an objective of the present disclosure to prevent a weight unbalance of an EHA without a weight increase.

An electro hydrostatic actuator disclosed herein includes an actuator body which includes a piston and a cylinder and which is extendable in a direction along a center axis; a hydraulic pump driven to supply operation oil to the actuator body; and an electric motor configured to drive the hydraulic pump. Each of the hydraulic pump and the electric motor is placed so as to surround an outer periphery of the actuator body, and the hydraulic pump and the electric motor are arranged in the direction along the center axis.

According to the foregoing configuration, each of the hydraulic pump and the electric motor is placed so as to surround the outer periphery of the actuator body which is extendable in the direction along the center axis. That is, since each of the hydraulic pump and the electric motor is placed so as to surround the center axis of the actuator body, the center of gravity of the electro hydrostatic actuator is located on the center axis or near the center axis. A weight unbalance is prevented or reduced, and, as a result, the vibration requirements for the electro hydrostatic actuator which is installed in an aircraft are likely to be satisfied easily.

Due to the improvement of the weight balance, a size increase of, e.g., an attachment flange required for the configuration as in the EHA system described in the foregoing patent document, i.e., the configuration in which the hydraulic pump and the electric motor are placed at the side of the actuator body is not necessary. This is advantageous to reduction in weight of the electro hydrostatic actuator. In addition, since the hydraulic pump and the electric motor are arranged in the direction along the center axis, the size of the electro hydrostatic actuator is reduced. This is also advantageous to the reduction in weight of the electro hydrostatic actuator.

The electric motor may include a stator fixed to the outer periphery of the actuator body, and a rotor arranged on an outer side relative to the stator and supported by the actuator body so as to rotate about the center axis of the hydraulic actuator. The hydraulic pump may be a swash plate type piston pump including a plurality of pistons arranged equiangularly so as to surround the outer periphery of the actuator body, a cylinder block which holds each of the pistons such that the each of the pistons reciprocates in the direction along the center axis and which is supported by the actuator body so as to rotate about the center axis, and a swash plate integrally provided with the actuator body. The rotor of the electric motor and the cylinder block of the hydraulic pump may be connected together through a torque transmission member arranged at a position on an outer side in a radial direction relative to the electric motor and the hydraulic pump.

The rotor configured "to rotate about the center axis" means not only the rotor which is rotatable about the center axis, but also the rotor which is substantially rotatable about the center axis in the state in which the rotation center of the rotor is positioned near the center axis. Similarly, the cylinder block configured "to rotate about the center axis" means not only the cylinder block which is rotatable about the center axis, but also the cylinder block which is substantially rotatable about the center axis in the state in which the rotation center of the cylinder block is positioned near the center axis.

According to the foregoing configuration, the rotor of the electric motor is supported by the actuator body, and rotates about the center axis. Thus, a rotation balance is obtained in driving of the electric motor. In addition, the cylinder block of the hydraulic pump which is connected to the rotor of the electric motor through the torque transmission member to be rotatably driven is supported by the actuator body so as to rotate about the center axis of the actuator body, resulting in no eccentric rotation. This is advantageous to prevention of abnormal vibration at the electro hydrostatic actuator.

Since the stator of the electric motor fixed to the outer periphery of the actuator body has a diameter larger than that of the actuator body, a relatively-large diameter of the stator is ensured. This is advantageous to ensuring of an output torque of the electric motor. On the other hand, since the thickness of the rotor (i.e., the thickness of the rotor in the radial direction) arranged around the outer periphery of the stator is not necessarily large, the outermost diameter of the electric motor can be reduced as much as possible. Thus, the high torque can be ensured, and the reduction in size of the electro hydrostatic actuator can be realized.

The swash plate may be arranged between each of the pistons and the electric motor which are arranged in the direction along the center axis, and an outlet port and an inlet port of the hydraulic pump may be formed on an end side of the actuator body opposite to the swash plate in the direction along the center axis.

Thus, even in the configuration in which the actuator body and the hydraulic pump are arranged substantially coaxially with each other, there is an advantage that pipes connected to the outlet and inlet ports and forming a hydrostatic circuit are easily arranged.

BRIEF DESCRIPTION OF THE DRAWINGS

FIGS. 1A and 1B are cross-sectional views of an electro hydrostatic actuator system.

DETAILED DESCRIPTION

Figure 2:
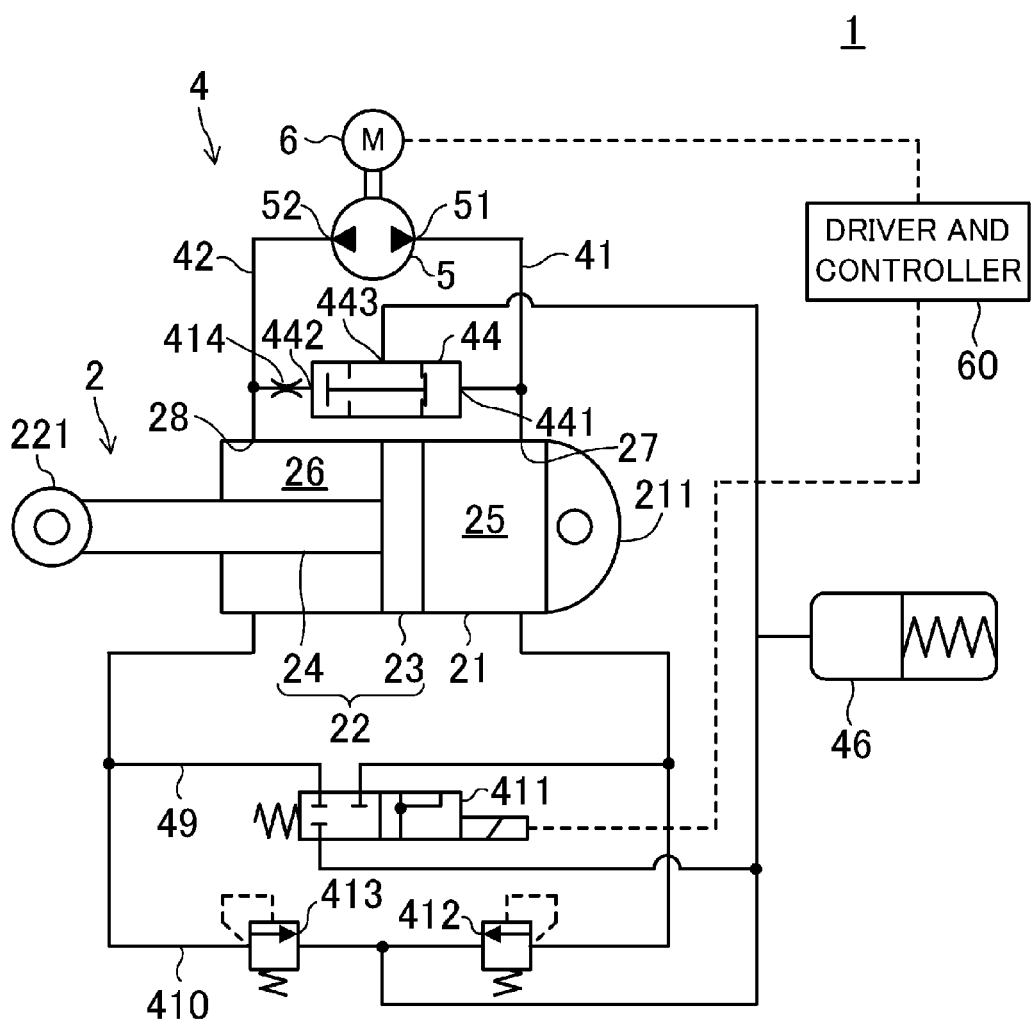
FIG. 2 is a hydrostatic circuit diagram of the electro hydrostatic actuator system illustrated in FIGS. 1A and 1B.

An embodiment of an electro hydrostatic actuator system (hereinafter referred to as an "EHA system") will be described below with reference to drawings. The embodiment will be set forth merely for purpose of an example in nature. FIG. 1A is a cross-sectional view of an EHA system 1, and FIG. 1B is a cross-sectional view along a 1b-1b line illustrated in FIG. 1A. FIG. 2 illustrates an entire configuration of a hydrostatic circuit of the EHA system 1. The EHA system 1 includes a hydraulic actuator 2 and a hydrostatic circuit 4. The EHA system 1 is installed in an aircraft as, e.g., an actuator system for retraction/extension of a landing gear, a flight control operation, a braking operation, and a steering operation.

The hydraulic actuator 2 is an extendable linear actuator which includes a cylinder 21 and a piston 22 and which is, as described later, extendable in a direction along a center axis X by a supply of operation oil. The piston 22 includes a piston head 23 accommodated and reciprocating in the cylinder 21, and a piston rod 24 integrally connected to the piston head 23 and arranged so as to protrude from the cylinder 21. Although not shown in the figure, a tip end of the piston rod 24 is, as a movable end 221, attached and fixed to an attachment part of aircraft equipment. In addition, in the hydraulic actuator 2, a cylinder end of the cylinder 21 which is an end opposite to the movable end 221 of the piston rod 24 in the direction along the center axis X is, as a fixed end 211, attached and fixed to an attachment part of the aircraft equipment. Thus, the hydraulic actuator 2 is attached and fixed to the aircraft equipment at two ends (i.e., the movable end 221 and the fixed end 211) positioned on the center axis X.

An inside of the cylinder 21 of the hydraulic actuator 2 is divided into a first chamber 25 on a side closer to a head relative to the piston head 23 and a second chamber 26 on a side closer to a rod relative to the piston head 23. A port (i.e., a first port 27 and a second port 28) through which operation oil flows in/out is formed in each of the first chamber 25 and the second chamber 26.

Referring to FIG. 2, the hydrostatic circuit 4 is a closed circuit provided between the hydraulic actuator 2 and a hydraulic pump 5. The hydrostatic circuit 4 includes a first oil path 41 connecting the first port 27 of the hydraulic actuator 2 and a first port 51 of the hydraulic pump 5 together, and a second oil path 42 connecting the second port 28 of the hydraulic actuator 2 and a second port 52 of the hydraulic pump 5 together.

The hydrostatic circuit 4 further includes an inverse shuttle valve 44 arranged between the first oil path 41 and the second oil path 42 so as to be parallel to the hydraulic pump 5. The inverse shuttle valve 44 includes two inlet ports 441, 442, i.e., a port communicating with the first oil path 41 and a port communicating with the second oil path 42, and a single outlet port 443 communicating with a reservoir 46 configured to absorb a fluctuation in total capacity of the first chamber 25 and the second chamber 26 of the hydraulic actuator 2. The inverse shuttle valve 44 has a function to select a connection between one of the two inlet ports 441, 442 having a lower pressure and the outlet port 443. Note that a flow restrictor orifice 414 (illustrated only in FIG. 2) is arranged between the inverse shuttle valve 44 and the second chamber 26 to adjust a flow rate from the second chamber 26 to the reservoir 46 through the inverse shuttle valve 44.

The hydraulic pump 5 is a pump which includes the first and second ports 51, 52 and which is capable of switching an inlet and an outlet of operation oil between the first port 51 and the second port 52. Referring to FIG. 1, the hydraulic pump 5 is a swash plate type piston pump. Note that the type of the hydraulic pump 5 is not limited to the foregoing. A specific configuration of the hydraulic pump 5 will be described later.

An electric motor 6 is connected to the hydraulic pump 5, and is driven to drive the hydraulic pump 5 (see FIG. 1). A specific configuration of the electric motor 6 will be described later. The followings are electrically connected to the electric motor 6 (see a dashed line in FIG. 2): a controller configured to control at least the electric motor 6; and a driver 60 (hereinafter simply referred to as a "driver 60") configured to supply power to the electric motor 6 depending on a control signal(s) from the controller. The driver 60 supplies power to the electric motor 6 to drive the electric motor 6. The switching of the output flow direction of the hydraulic pump 5 and the input flow direction of the hydraulic pump 5 is performed by reversing a rotation direction of the electric motor 6.

A fail-safe hydraulic circuit which is not shown in FIG. 1 is also provided in the hydrostatic circuit 4. The fail-safe hydraulic circuit includes a fourth oil path 49 and a fifth oil path 410 each provided to cause the first chamber 25 and the second chamber 26 of the hydraulic actuator 2 to communicate with each other. A solenoid valve 411 controlled by the driver 60 is arranged on the fourth oil path 49, and a first relief valve 412 and a second relief valve 413 each opened at equal to or higher than a predetermined pressure are arranged on the fifth oil path 410. The fifth oil path 410 is, at part thereof between the first relief valve 412 and the second relief valve 413, connected to the reservoir 46.

The solenoid valve 411 is a three-port two-way switching valve including a port communicating with the first oil path 41, i.e., with the first chamber 25 of the hydraulic actuator 2, a port communicating with the second oil path 42, i.e., with the second chamber 26 of the hydraulic actuator 2, and a port communicating with the reservoir 46. The solenoid valve 411 is switchable between a first state (state illustrated in FIG. 2) in which the first chamber 25 and the second chamber 26 of the hydraulic actuator 2 and the reservoir 46 are disconnected from each other and a second state in which the first chamber 25, the second chamber 26, and the reservoir 46 communicate with each other. In such a manner that the solenoid valve 411 is normally in the first state and is, on the other hand, in the second state upon emergency (upon fail), the hydraulic actuator 2 can be extended even if the hydraulic pump 5 is not operated.

A basic operation of the EHA system 1 configured as described above is as follows. That is, in order to extend the hydraulic actuator 2, the electric motor 6 is driven by the driver 60 with the solenoid valve 411 of the hydrostatic circuit 4 being switched to the first state referring to FIG. 2, and then the hydraulic pump 5 is driven such that operation oil is discharged from through the first port 51. This allows the operation oil to be supplied to the first chamber 25 through the first oil path 41 and the first port 27, and the piston 22 moves to the left as viewed in FIG. 1. As a result, the hydraulic actuator 2 is extended.

In association with the supply of operation oil through the first oil path 41 to the inverse shuttle valve 44, the inverse shuttle valve 44 causes the second oil path 42 and the reservoir 46 to communicate with each other (see the state illustrated in FIG. 2). Thus, operation oil discharged from the second chamber 26 by the movement of the piston 22 returns to the second port 52 of the hydraulic pump 5 through the second oil path 42. Meanwhile, in order to compensate for a volume capacity difference between the first chamber 25 and the second chamber 26 of the hydraulic actuator 2, operation oil is supplied from the reservoir 46 to the second port 52 of the hydraulic pump 5 through the inverse shuttle valve 44 and the restrictor orifice 414.

Conversely, in order to retract the hydraulic actuator 2, the electric motor 6 is driven with the solenoid valve 411 being switched to the first state, and then the hydraulic pump 5 is driven such that operation oil is discharged through the second port 52. This allows the operation oil to be supplied to the second chamber 26 through the second oil path 42 and the second port 28, and the piston 22 moves to the right as viewed in FIG. 1. As a result, the hydraulic actuator 2 is retracted.

Although not shown in the figure, the inverse shuttle valve 44 causes the first oil path 41 and the reservoir 46 to communicate with each other in association with the supply of operation oil through the second oil path 42 to the inverse shuttle valve 44. Thus, part of operation oil discharged from the first chamber 25 by the movement of the piston 22 returns to the first port 51 of the hydraulic pump 5 through the first oil path 41, and part of the operation oil reaches the reservoir 46 through the inverse shuttle valve 44.

Referring to FIG. 1, in the EHA system 1, the electric motor 6 and the hydraulic pump 5 are placed so as to surround the outer periphery of the hydraulic actuator 2, and are arranged in the direction along the center axis X of the hydraulic actuator 2 (in the right-left direction as viewed in FIG. 1). Note that, for the sake of clarity of description, the left side as viewed in FIG. 1 is hereinafter referred to as a "front side," and the right side as viewed in FIG. 1 is hereinafter referred to as a "rear side."

In a substantially middle position of an outer peripheral surface of the cylinder 21 in the direction along the center axis X, a swash plate 53 of the hydraulic pump 5 is integrally connected with the cylinder 21. The swash plate 53 of the hydraulic pump 5 is also vertically arranged on the outer peripheral surface of the cylinder 21 so as to outwardly extend in a radial direction. The electric motor 6 including a stator 61 and a rotor 62 is arranged on the front side relative to the swash plate 53.

A bearing support 63 configured to rotatably support the rotor 62 is fitted onto the cylinder 21 along the outer peripheral surface thereof, and the stator 61 of the electric motor 6 is fixed to the outer peripheral surface of the cylinder 21 through the bearing support 63.

The bearing support 63 includes standing walls 631, 632 respectively on the front side (left side as viewed in FIG. 1) and the rear side (right side as viewed in FIG. 1) relative to the stator 61. In addition, the standing walls 631, 632 outwardly extend in the radial direction such that a pair of bearings 64 are supported at positions on an outer side in the radial direction relative to the stator 61. One of the bearings 64 is attached and fixed to an outer end of the front standing wall 631 in the radial direction, and the other bearing 64 is attached and fixed to an outer end of the rear standing wall 632 in the radial direction.

The rotor 62 of the electric motor 6 is, between the bearings 64 arranged apart from each other in the direction along the center axis X, arranged with a predetermined distance from the stator 61 in the radial direction. As described above, in the electric motor 6, the stator 61 is arranged on an inner side in the radial direction, and the rotor 62 is arranged in the outer side in the radial direction.

A cylindrical torque transmission member 65 extending toward the rear side in the direction along the center axis X beyond the swash plate 53 is arranged on an outer peripheral side of the rotor 62, and the rotor 62 and the torque transmission member 65 are fixed together so as to rotate in an integrated manner. The bearings 64 and the torque transmission member 65 are connected together along an inner peripheral surface thereof. Thus, the rotor 62 and the torque transmission member 65 are supported by the hydraulic actuator 2 so as to rotate about the center axis X of the hydraulic actuator 2. The torque transmission member 65 is a member configured to transmit a torque of the electric motor 6 to the hydraulic pump 5 to drive the hydraulic pump 5. As described above, the configuration in which the rotor 62 is arranged on the outer side in the radial direction is employed as the configuration of the electric motor 6, and therefore the torque transmission member 65 extending in the direction along the center axis X can be arranged on the outermost position in the radial direction. Thus, there is an advantage that the torque transmission member 65 can be easily arranged.

The hydraulic pump 5 is, as described above, the swash plate type piston pump, and includes a plurality of pistons 54 arranged equiangularly around the outer peripheral surface of the cylinder 21. Each of the pistons 54 includes a piston body 541 reciprocating in the direction along the center axis X, a spring 542 arranged coaxially with the piston body 541, and a piston shoe 543 attached to a front end (end on the left side as viewed in FIG. 1) of the piston body 541 and sliding on the swash plate 53.

The pistons 54 are held by an annular cylinder block 55. The cylinder block 55 is attached to the outer peripheral surface of the cylinder 21 through bearings 56, thereby rotating about the center axis X. In addition, the torque transmission member 65 is fixed to the cylinder block 55. Thus, when the electric motor 6 is driven, a motor torque is transmitted to the cylinder block 55 through the torque transmission member 65, and the cylinder block 55 rotates about the center axis X.

A valve plate 57 including the first port 51 and the second port 52 is arranged at the rear of the cylinder block 55. As described above, in association with the rotation of the cylinder block 55 about the center axis X, each of the pistons 54 revolves around the center axis X on an outer peripheral side of the cylinder 21, and reciprocates in the direction along the center axis X. In association with the revolution and reciprocation of the pistons 54, operation oil is discharged through the first port 51 or the second port 52.

The electric motor 6 and the hydraulic pump 5 are accommodated in a housing 29 attached and fixed to the cylinder 21. In the illustrated example, part of the first oil path 41 and part of the second oil path 42 are formed in the housing 29.

As in the foregoing, in the EHA system 1, the electric motor 6 and the hydraulic pump 5 are placed so as to surround the outer periphery of the body of the hydraulic actuator 2, and are arranged in the direction along the center axis X. This allows the center of gravity of the EHA system 1 to be positioned on the center axis X or be positioned near the center axis X. As a result, a weight unbalance of the EHA system 1 is prevented or reduced. Thus, vibration requirements for the EHA system 1 as various actuators for the aircraft can be easily satisfied.

Since the electric motor 6, the hydraulic pump 5, and the hydraulic actuator 2 are integrally connected without the weight unbalance, the weight of the EHA system 1 can be reduced. This is advantageous for the EHA system 1 to be installed in the aircraft.

The rotor 62 of the electric motor 6 is rotatably arranged about the center axis X of the hydraulic actuator 2, and therefore such a configuration provides a rotation balance in driving of the electric motor 6. This is advantageous to prevention of abnormal vibration of the EHA system 1. Similarly, the cylinder block 55 of the hydraulic pump 5 is also rotatably arranged about the center axis X, and therefore such a configuration provides a rotation balance in driving of the hydraulic pump 5. This is advantageous to the prevention of the abnormal vibration of the EHA system 1.

The electric motor 6 is placed around the outer periphery of the hydraulic actuator 2. Thus, the diameter of the stator 61 is larger than the outer diameter of the cylinder 21, and therefore a relatively-large diameter of the stator 61 is ensured. This is advantageous to ensuring of a high torque of the electric motor 6. In addition, the thickness of the rotor 62 (i.e., the thickness of the rotor 62 in the radial direction) is not so large, and the outermost diameter of the electric motor 6 is relatively small. This is advantageous to reduction in size of the EHA system 1.

The configuration in which the rotor 62 is arranged on the outer side in the radial direction of the electric motor 6 allows the arrangement of the torque transmission member 65 at the outermost position in the radial direction. Thus, the torque transmission member 65 can be easily arranged, and this is, as a result, advantageous to reduction in size and weight of the EHA system 1.

The first and second ports 51, 52 of the hydraulic pump 5 are placed on a rear end side of the hydraulic actuator 2. Thus, in the EHA system 1 in which the hydraulic actuator 2 and the hydraulic pump 5 are arranged coaxially with each other, pipes of the EHA system 1 can be easily arranged. This is also advantageous to the reduction in size and weight of the EHA system 1.

Figure 3A:
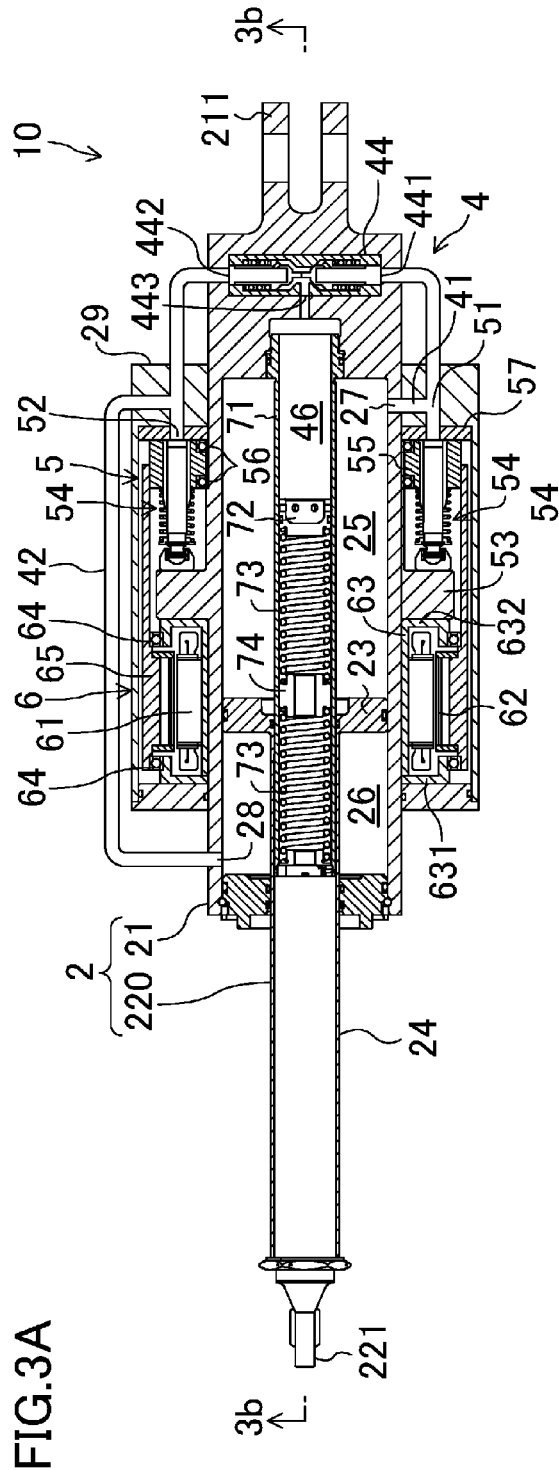
FIGS. 3A and 3B are cross-sectional views of the electro hydrostatic actuator system.
Figure 3B:
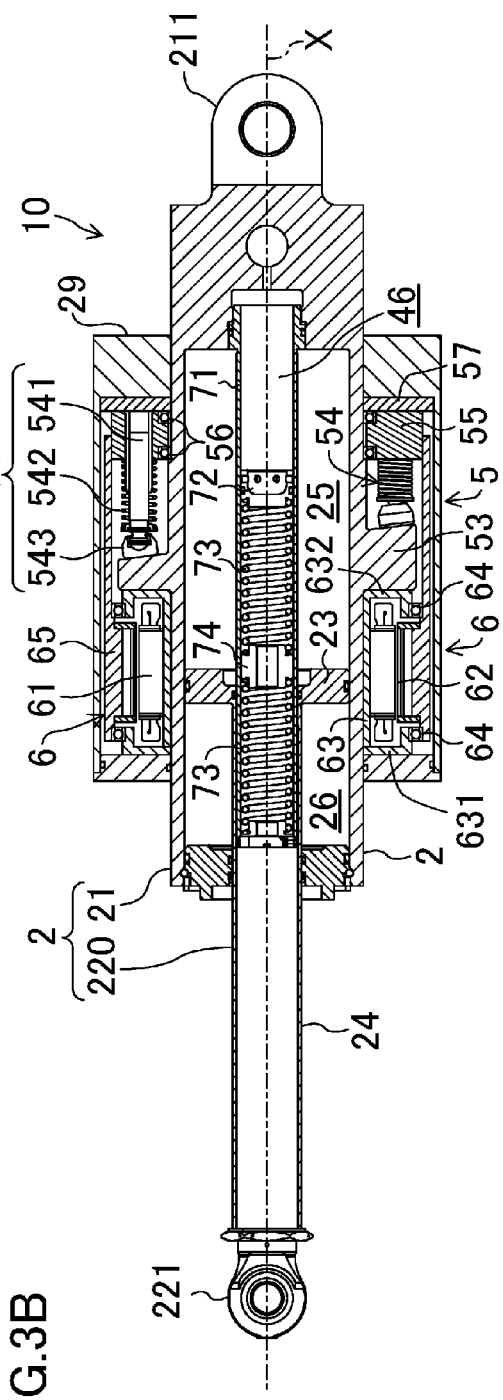

FIG. 3A is a cross-sectional view of an EHA system 10 in which a reservoir 46 is provided inside a hydraulic actuator 2. FIG. 3B is a cross-sectional view along a 3*b*-3*b* line illustrated in FIG. 3A. Note that the same reference numerals as those shown in the EHA system 1 illustrated in FIG. 1 are used to represent equivalent elements in the EHA system 10 illustrated in FIGS. 3A and 3B.

In the reservoir embedded type EHA system 10, a piston rod 220 is configured to have a hollow. A standpipe 71 arranged coaxially with a center axis X in a cylinder 21 and fixed to the cylinder 21 is inserted into a hollow of the piston rod 220. An inside of the standpipe 71 serves as the reservoir 46 which stores operation oil, and a port communicating with the reservoir 46 is formed in a rear end part of the standpipe 71. Note that, in the reservoir embedded type EHA system 10 exemplified in FIGS. 3A and 3B, an inverse shuttle valve 44 is also embedded in a rear end part of the cylinder 21.

The followings are embedded in the standpipe 71: a free piston 72 defining the reservoir 46; and a coil spring 73 configured to elastically support the free piston 72 such that the free piston 72 reciprocates in a direction along the center axis X. The coil spring 73 biases the free piston 72 in a direction in which a reservoir capacity is decreased. In the illustrated example, two coil springs 73 are arranged in series with an intermediate member 74 being interposed between the coil springs 73. Instead of such a configuration, a signal coil spring may be used.

Since the reservoir 46 is embedded in the reservoir embedded type EHA system 10, the size of the EHA system 1 can be further reduced, and possibility of installing the EHA system 10 in aircraft equipment can be enhanced.

The hydrostatic circuit 4 illustrated in FIG. 2 has been set forth merely for purpose of an example in nature. Any circuit configurations may be employed for circuits forming the EHA systems 1, 10.

The hydraulic pump 5 is not limited to the swash plate type piston pump. As long as the hydraulic pump 5 is, e.g., a rotary hydraulic pump which is arranged so as to surround the outer periphery of the hydraulic actuator 2 and which is rotatable about the center axis X, such a rotary hydraulic pump is applicable to the technique disclosed herein.

What is claimed is:

1. An electro hydrostatic actuator, comprising:
    an actuator body which includes a piston and a cylinder and which is extendable in a direction along a center axis;
    a hydraulic pump driven to supply operation oil to the actuator body; and
    an electric motor configured to drive the hydraulic pump, wherein:
    each of the hydraulic pump and the electric motor is placed so as to surround an outer periphery of the actuator body;
    the hydraulic pump and the electric motor are arranged in the direction along the center axis;
    the electric motor comprises:
        a stator fixed to the outer periphery of the actuator body; and
        a rotor arranged on an outer side relative to the stator and supported by the actuator body so as to rotate about the center axis;
    the hydraulic pump is a swash plate type piston pump comprising:
        a plurality of pistons arranged equiangularly so as to surround the outer periphery of the actuator body;
        a cylinder block which holds each of the pistons such that the each of the pistons reciprocates in the direction along the center axis and which is supported by the actuator body so as to rotate about the center axis; and
        a swash plate integrally connected to the actuator body; and
    the rotor of the electric motor and the cylinder block of the hydraulic pump are connected together through a torque transmission member arranged at a position on an outer side in a radial direction relative to the electric motor and the hydraulic pump.

2. The electro hydrostatic actuator of claim 1, wherein
the swash plate is arranged between each of the pistons and the electric motor which are arranged in the direction along the center axis, and
an outlet port and an inlet port of the hydraulic pump are placed on an end side of the actuator body opposite to the swash plate in the direction along the center axis.

* * * * *